United States Patent
Frady

(10) Patent No.: US 8,900,055 B2
(45) Date of Patent: Dec. 2, 2014

(54) LOCKDOWN BUTTON FOR GAMING MACHINES AND DEVICES

(75) Inventor: Jamison Frady, Reno, NV (US)

(73) Assignee: IGT, Las Vegas, NV (US)

( * ) Notice: Subject to any disclaimer, the term of this patent is extended or adjusted under 35 U.S.C. 154(b) by 91 days.

(21) Appl. No.: 13/456,162

(22) Filed: Apr. 25, 2012

(65) Prior Publication Data

US 2013/0084949 A1 Apr. 4, 2013

Related U.S. Application Data

(60) Provisional application No. 61/541,474, filed on Sep. 30, 2011.

(51) Int. Cl.
*G07F 17/32* (2006.01)
*A63F 9/24* (2006.01)
*A63F 13/00* (2014.01)

(52) U.S. Cl.
CPC . *A63F 9/24* (2013.01); *G07F 17/32* (2013.01); *A63F 13/00* (2013.01)
USPC .................................. 463/29; 463/25; 463/42

(58) Field of Classification Search
USPC ..................... 463/16–20, 25, 29, 42
See application file for complete search history.

(56) References Cited

U.S. PATENT DOCUMENTS

| | | | |
|---|---|---|---|
| 6,312,333 B1 * | 11/2001 | Acres | 463/25 |
| 6,498,655 B1 | 12/2002 | Brooks et al. | |
| 6,908,387 B2 | 6/2005 | Hedrick et al. | |
| 6,962,531 B2 | 11/2005 | Pace et al. | |
| 2002/0116615 A1 | 8/2002 | Nguyen et al. | |
| 2004/0020960 A1 | 2/2004 | Hauer et al. | |
| 2004/0048668 A1 | 3/2004 | Brosnan | |
| 2004/0147313 A1 * | 7/2004 | Stanley et al. | 463/29 |
| 2004/0189517 A1 | 9/2004 | Pande et al. | |
| 2004/0209690 A1 | 10/2004 | Bruzzese et al. | |
| 2004/0235562 A1 | 11/2004 | Kiely et al. | |
| 2005/0021597 A1 | 1/2005 | Derasmo et al. | |
| 2006/0217202 A1 | 9/2006 | Burke et al. | |
| 2006/0252530 A1 * | 11/2006 | Oberberger et al. | 463/29 |
| 2006/0287095 A1 | 12/2006 | Mattice et al. | |
| 2007/0046423 A1 | 3/2007 | Baucom | |
| 2008/0207335 A1 * | 8/2008 | DiMichele | 463/46 |

(Continued)

FOREIGN PATENT DOCUMENTS

JP 2006-141732 6/2006

OTHER PUBLICATIONS

U.S. Appl. No. 13/456,153, "Keyless Entry into and Maintenance of Gaming Machine," Frady, Jamison, filed Apr. 25, 2012.

(Continued)

*Primary Examiner* — Jasson Yoo
(74) *Attorney, Agent, or Firm* — Foley & Lardner LLP

(57) ABSTRACT

Techniques providing lock down of a gaming machine by a wireless device associated with a user. A request from a wireless device to lock down the gaming machine is received at the gaming machine or a network server in communication with the gaming machine. The gaming machine or network server determines whether the user associated with the wireless device has access to lock down the gaming machine. Upon determining that the user has access, the user is allowed to lock down the gaming machine with the wireless device. Lock down may include placing the gaming machine in an unplayable state.

25 Claims, 12 Drawing Sheets

(56) References Cited

U.S. PATENT DOCUMENTS

| | | |
|---|---|---|
| 2008/0226130 A1 | 9/2008 | Kansal et al. |
| 2008/0274795 A1 | 11/2008 | Carpenter et al. |
| 2009/0036186 A1 | 2/2009 | Benco et al. |
| 2009/0100070 A1 | 4/2009 | Quartararo |
| 2010/0075751 A1* | 3/2010 | Garvey et al. .................. 463/30 |
| 2010/0203961 A1 | 8/2010 | Burke et al. |
| 2010/0222141 A1 | 9/2010 | Lasalvia et al. |
| 2010/0285878 A1* | 11/2010 | Tarantino ...................... 463/36 |
| 2012/0052954 A1 | 3/2012 | Zhu et al. |
| 2012/0084734 A1* | 4/2012 | Wilairat ...................... 715/863 |
| 2012/0165101 A1* | 6/2012 | Krishnamoorthy et al. .... 463/42 |

OTHER PUBLICATIONS

U.S. Appl. No. 13/456,155, "Gaming Machine External Device Application," Frady, Jamison, filed Apr. 25, 2012.

U.S. Appl. No. 13/456,159, "Floor Management Via Wireless Device," Frady, Jamison, filed Apr. 25, 2012.

U.S. Appl. No. 13/456,161, "In Casino Location Services Via Wireless Device," Frady, Jamison, filed Apr. 25, 2012.

U.S. Appl. No. 13/456,164, "Digital Log for Gaming Machines," Frady, Jamison, et al., filed Apr. 25, 2012.

U.S. Appl. No. 13/456,151, "In Casino Services and Keyless Entry and Maintenance Via Camera Applications," Frady, Jamison, filed Apr. 25, 2012.

\* cited by examiner

LOCKDOWN BUTTON FOR GAMING MACHINES AND DEVICES

CROSS-REFERENCE TO RELATED APPLICATIONS

This application claims priority under 35 U.S.C. §119(e) from U.S. Provisional Patent Application No. 61/541,474, filed Sep. 30, 2011, titled "LOCKDOWN BUTTON FOR GAMING MACHINES AND DEVICES," naming Jamison Frady as the inventor, and which is incorporated herein by reference for all purposes.

TECHNICAL FIELD

The present disclosure relates generally to wager-based gaming machines and wireless devices.

BACKGROUND

Electronic gaming machines currently employ antiquated locking, entry, and access log techniques. For access logs, operators (i.e. casinos) and suppliers alike use paper log books to manually enter and track machine access information, which (in the simplest form) includes the technician information, reason for accessing the gaming machine, date, and time. There are many opportunities for errors to be introduced in this manual process, and the information entered into the log book is locked away in the gaming machine or a stand underneath the gaming machine, making review and data monitoring from these log books a time consuming process. Additionally, the operator may receive out of date data from these log books as a result of the recorded information having to be physically retrieved from every machine or machine stand in order to be viewed. There have been occurrences where a certain gaming machine's filter becomes clogged, and the decreased air flow actually causes parts in the computer portion of the gaming machine to melt down and fail. If the log books containing information of the frequency of the filter changes were more readily available, for example, the operator could have possibly prevented the computer failure by changing the filters more often, relocating the gaming machine, or changing other external factors around the gaming machine.

Another barrier to machine maintenance and accurate record keeping is the entry method itself. Using physical locks and keys to gain entry to a gaming machine, while very secure, is also very out of date. Physical locks and keys in gaming machines have always been specified, purchased, installed, and tracked by the operator. Often, gaming regulators require two locks on the main entry door on a machine, then another lock to gain access to the cashbox drop, and then one (and in some jurisdictions, two) more lock(s) on the cashbox itself. With this possible combination of up to five locks per machine, it is easy to imagine that the cost to purchase, maintain and track all these lock and key sets is quite expensive for even a small gaming floor. Additionally, consider the case where a technician may lose a key or have it stolen, and then the operator must replace their entire gaming floor with all new lock sets to ensure the security of the gaming machines—this is a very costly situation.

In gaming properties, security is paramount to the operators, and machine maintenance—while important to the profitability of the gaming machine—is a lower priority. A floor supervisor's (often called a "pit boss") job is to ensure the security of the games and compliance with the regulations of the operator's legal jurisdiction. Because of these concerns, it is a common practice to disallow technicians to access the gaming machine to perform preventative maintenance or even read information from a paper log book when a patron is playing the game; furthermore, due to these security concerns and various regulations, access is limited during certain times of the day. As such, both the difficulty of machine entry with physical locks and the out of date paper log books affect the frequency and even the methods of how a machine is maintained and serviced. It is common for gaming machines to be serviced only when a particular problem has occurred. Preventative maintenance is not commonly performed and only occurs as a result of trial by error because there is currently no good way to gather meaningful or timely data.

An additional result of the security measures is that an operator usually only had a small window of time in which to make their cash "drops" (changing out the cashboxes full of money with empty ones). A large inefficiency in the cash drop process, as noted, is the use of physical locks on the gaming machines due to the manual process of finding, inserting, unlocking, locking, and removing the correct key and then moving on to the next machine. Because their time is limited and the cash drop method is cumbersome, cash drop crews often only do half of the floor one day and the other half the next day; this ties up half of the day's take and leaves it in the gaming machines, and it also introduces the possibility of a gaming machine going down because the cashbox is full and will not accept any more tender.

Last, with regards to security, the gaming machines currently have no way of communicating to security or the pit boss that there is questionable activity going on. Common cheating practices involve attempting to "string" (pull a inserted bill back out via an attached string or wire once the credits have appeared on the game), drilling holes in the gaming machine to access components, electrically shocking the gaming machine, etc. In addition to cheating, patron damage to machines is also a concern. To address cheating and damage problems, operators invest in security systems that are monitored in back rooms by security officers, who then have to communicate to pit bosses and security officers on the gaming floor of a possible problem that they have identified via, for instance, a security camera. This is akin to installing a webcam outside of a parking lot in order to monitor a car in the parking lot instead of just simply installing an alarm in the car itself.

SUMMARY

Various implementations described or referenced herein are directed to different devices, methods, systems, and computer program products for providing a gaming machine. In some implementations, devices, methods, systems, and computer program products may be configured or designed for use in a casino environment.

In some implementations, a network server provides lock down of a gaming machine by a wireless device associated with a user. The network server includes a communication component configured to communicate with the wireless device. The network server further includes one or more processors configured to: receive a request from the wireless device to lock down the gaming machine; determine whether the user has access to lock down the gaming machine; responsive to determining that the user has access, enable the user to lock down the gaming machine with the wireless device.

In some implementations, lock down includes placing the gaming machine in an unplayable state. In some implementations, lock down includes restricting keyless entry to one or more cabinets of the gaming machine. In some implementations, lock down of the gaming machine may further be performed with a physical button on the gaming machine.

In some implementations, the communication component is further configured to communicate with the gaming machine. The one or more processors of the network server are further configured to lock down the gaming machine.

In some implementations, lock down triggers a visual alarm or an audio alarm.

In some implementations, the one or more processors are further configured to lock down the gaming machine upon occurrence of a trigger event at the gaming machine.

In some implementations, the one or more processors are further configured to: receive a request from the wireless device to unlock the gaming machine; determine whether the user has access to unlock the gaming machine; and responsive to determining that the user has access, enable the user to unlock the gaming machine with the wireless device.

In some implementations, the one or more processors are further configured to determine whether the user has access to lock down the gaming machine by determining whether the user has a sufficient level of security clearance to lock down the gaming machine.

In some implementations, a gaming machine includes a communication component and one or more processors. The communication component is configured to communicate with a wireless device. The one or more processors are configured to: receive a request from the wireless device to lock down the gaming machine; determine whether a user associated with the wireless device has access to lock down the gaming machine; and responsive to determining that the user has access, enable the user to lock down the gaming machine with the wireless device.

In some implementations, lock down includes placing the gaming machine in an unplayable state. In some implementations, lock down includes restricting keyless entry to one or more cabinets of the gaming machine. In some implementations, the gaming machine includes a physical lock down button configured to be operable to lock down the gaming machine.

In some implementations, the communication component is further configured to communicate with a network server. The one or more processors of the gaming machine are further configured to: receive a request for lock down of the gaming machine from the network server; and responsive to receiving the request from the network server, lock down the gaming machine.

In some implementations, lock down triggers a visual alarm or audio alarm.

In some implementations, the one or more processors are further configured to lock down the gaming machine upon occurrence of a trigger event at the gaming machine.

In some implementations, the one or more processors are further configured to: receive a request from the wireless device to unlock the gaming machine; determine whether the user has access to unlock the gaming machine; and responsive to determining that the user has access, enable the user to unlock the gaming machine with the wireless device In some implementations, the one or more processors are further configured to determine whether the user has access to lock down the gaming machine by determining whether the user has a sufficient level of security clearance to lock down the gaming machine.

In some implementations, the gaming machine further includes a non-volatile memory device. The one or more processors are further configured to: receive from the wireless device an indication to lock down the gaming machine; and responsive to receiving the indication: storing the state of the gaming machine in the non-volatile memory, and locking down the gaming machine.

In some implementations, a method provides for lock down of a gaming machine by a wireless device associated with a user. The method includes: receiving, at the gaming machine or a network server, a request from the wireless device to lock down the gaming machine; determining, at the gaming machine or a network server, whether the user has access to lock down the gaming machine; and responsive to determining that the user has access, enable the user to lock down the gaming machine with the wireless device.

In some implementations, lock down includes placing the gaming machine in an unplayable state. In some implementations, lock down includes restricting keyless entry to one or more cabinets of the gaming machine. In some implementations, the method includes locking down the gaming machine responsive to an indication that a physical lock down button on the gaming machine has been pressed.

In some implementations, the method further includes: sending an indication to lock down the gaming machine from the network server to the gaming machine; and responsive to receiving the indication at the gaming machine, locking down the gaming machine.

In some implementations, lock down triggers a visual alarm or audio alarm.

In some implementations, the method further includes locking down the gaming machine upon occurrence of a trigger event at the gaming machine.

In some implementations, the method further includes: receiving, at the gaming machine or the network server, a request from the wireless device to unlock the gaming machine; determining, at the gaming machine or the network server, whether the user has access to unlock the gaming machine; and responsive to determining that the user has access, enabling the user to unlock the gaming machine with the wireless device.

In some implementations, determining whether the user has access to lock down the gaming machine further includes determining whether the user has a sufficient level of security clearance to lock down the gaming machine.

Aspects of the disclosed subject matter may be implemented by networked gaming machines, game servers and other such devices. These and other features and benefits of aspects of the disclosed subject matter will be described in more detail below with reference to the associated drawings. In addition, other methods, features and advantages of the disclosed subject matter will be or will become apparent to one with skill in the art upon examination of the following figures and detailed description. It is intended that all such additional methods, features and advantages be included within this description, be within the scope of the disclosed subject matter, and be protected by the accompanying claims.

BRIEF DESCRIPTION OF THE DRAWINGS

The included drawings are for illustrative purposes and serve only to provide examples of possible structures and process steps for the disclosed subject matter. These drawings in no way limit any changes in form and detail that may be made to various implementations by one skilled in the art without departing from the spirit and scope of the disclosure.

DETAILED DESCRIPTION

Applications of gaming machines, systems and methods according to one or more implementations are described in this section. These examples are being provided solely to add context and aid in the understanding of the present disclosure. It will thus be apparent to one skilled in the art that the techniques described may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure, as defined by the appended claims.

Figure 1:
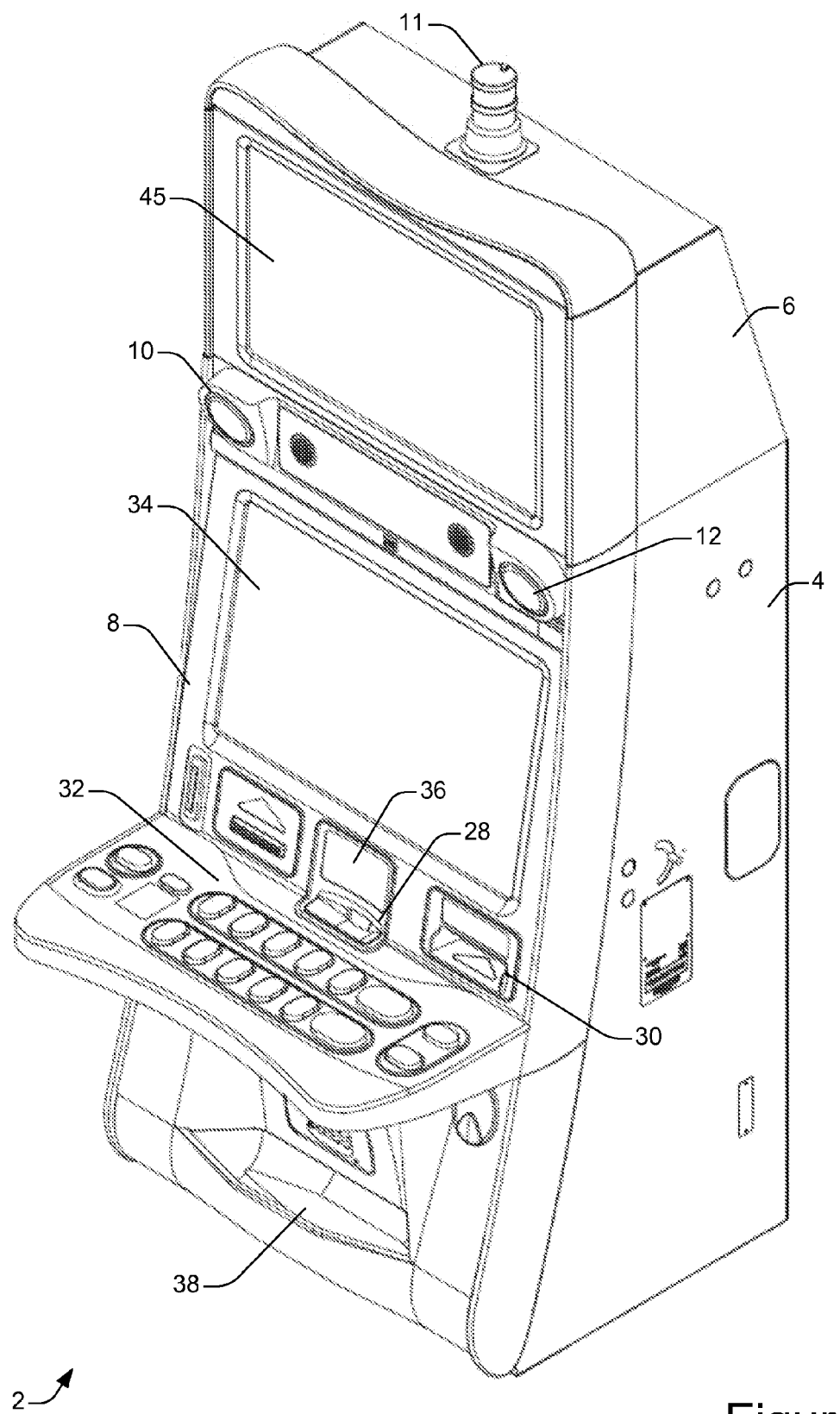
FIGS. 1, 2A and 2B show perspective diagrams of a gaming machine 2, configured in accordance with some implementations.
Figure 2A:
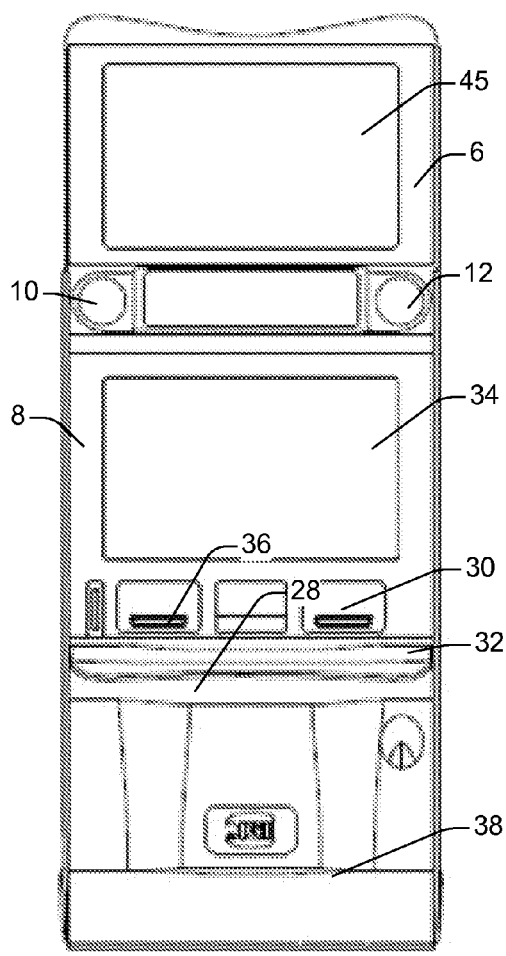
Figure 2B:
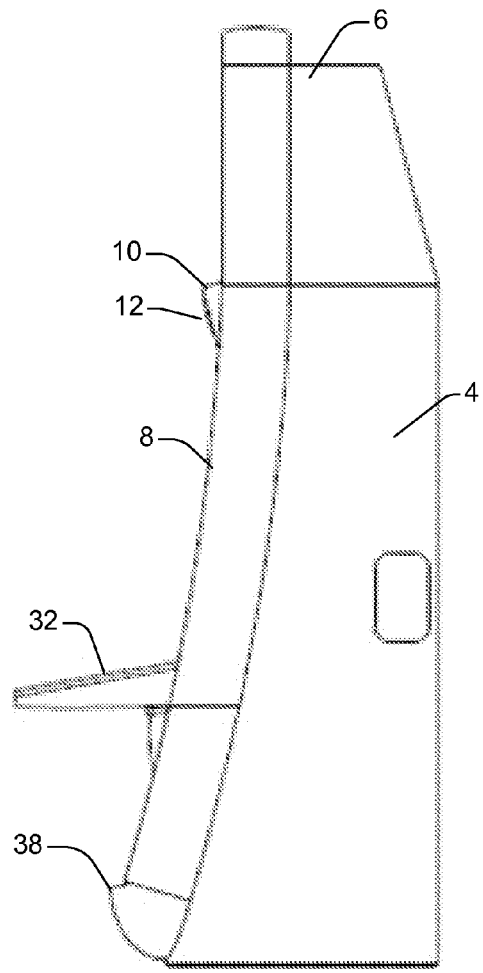

FIGS. 1, 2A and 2B show perspective views of an electronic gaming machine 2, configured in accordance with some implementations. The gaming machine 2 includes a main cabinet 4, which generally surrounds the gaming machine interior and is viewable by users. The main cabinet includes a main door 8 on the front of the gaming machine, which opens to provide access to the interior of the gaming machine.

In some implementations, the gaming machine may include any of a plurality of devices. For example, the gaming machine may include a ticket printer that prints bar-coded tickets, a key pad for entering player tracking information, a display (e.g., a video display screen) for displaying player tracking information, a card reader for entering a magnetic striped card containing player tracking information, and any other devices. The ticket printer may be used to print tickets for a cashless ticketing system. In FIGS. 1-2B, attached to the main door is a payment acceptor 28, a bill validator 30, and a coin tray 38. The payment acceptor may include a coin slot and/or a payment, note, or bill acceptor, where the player inserts money, coins, tokens, or other types of payments.

In some implementations, devices such as readers or validators for credit cards, debit cards, smart cards, or credit slips may facilitate payment. For example, a player may insert an identification card into a card reader of the gaming machine. The identification card may be a smart card coded with a player's identification, credit totals (or related data) and other relevant information. As another example, a player may carry a portable device, such as a cell phone, a radio frequency identification tag, a tablet computer with a touch screen or any other suitable wireless device. The portable device may communicates a player's identification, credit totals (or related data), and/or any other relevant information to the gaming machine. As yet another example, money may be transferred to a gaming machine through electronic funds transfer. When a player funds the gaming machine, another logic device coupled to the gaming machine may determine the amount of funds entered and display the corresponding amount on a display device.

In some implementations, attached to the main door is a plurality of player-input switches or buttons 32. The input switches can include any suitable devices which enable the player to produce an input signal which is received by a processor. The input switches may include a game activation device that may be used by the player to start any primary game or sequence of events in the gaming machine. The game activation device can be any suitable play activator such as a "bet one" button, a "max bet" button, or a "repeat the bet" button. In some instances, upon appropriate funding, the gaming machine may begin the game play automatically. Alternately, the gaming machine may automatically activate game play after detecting user input via the game activation device.

In some implementations, one input switch is a cash-out button. The player may push the cash-out button and cash out to receive a cash payment or other suitable form of payment corresponding to the number of remaining credits. For example, when the player cashes out, the player may receive the coins or tokens in a coin payout tray. As another example, the player may receive other payout mechanisms such as tickets or credit slips redeemable by a cashier (or other suitable redemption system) or funding to the player's electronically recordable identification card. As yet another example, funds may be transferred from the gaming machine to the player's smart card.

In some implementations, one input switch is a touchscreen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In some implementations, the gaming machine may include communication ports or interfaces for enabling communication of the gaming machine processor with external peripherals, such as external video sources, expansion buses, game or other displays, a Small Computer System Interface (SCSI) port, a key pad, or a network interface for communicating via a network.

In some implementations, the gaming machine may include a label area, such as the label area 36. The label area may be used to display any information or insignia related to activities conducted at the gaming machine.

In some implementations, the electronic gaming machine may include one or more display devices. For example, the electronic gaming machine 2 includes display devices 34 and 45. The display devices 34 and 45 may each include any of a cathode ray tube, a liquid crystal display (LCD), a light emitting diode (LED) based display, an organic light emitting diode (OLED) based display, a polymer light emitting diode (PLED) based display, a surface-conduction electron-emitter display (SED), an E-ink display, a plasma display, a multi-layer display, a television display, a display including a projected and/or reflected image, or any other suitable electronic display device.

In some implementations, the display devices at the gaming machine may include one or more electromechanical devices such as one or more rotatable wheels, reels, or dice. The display device may include an electromechanical device adjacent to a video display, such as a video display positioned in front of a mechanical reel. The display devices may include dual-layered or multi-layered electromechanical and/or video displays that cooperate to generate one or more images. The display devices may include a mobile display device, such as a smart phone or tablet computer, that allows play of at least a portion of the primary or secondary game at a location remote from the gaming machine. The display devices may be of any suitable size and configuration, such as a square, a rectangle or an elongated rectangle.

In some implementations, the display devices of the gaming machine are configured to display game images or other suitable images. The images may include symbols, game indicia, people, characters, places, things, faces of cards, dice, and any other images. The images may include a visual representation or exhibition of the movement of objects such as mechanical, virtual, or video reels and wheel. The images may include a visual representation or exhibition of dynamic lighting, video images, or any other images.

In some implementations, the electronic gaming machine may include a top box. For example, the gaming machine 2 includes a top box 6, which sits on top of the main cabinet 4. The top box 6 may house any of a number of devices, which may be used to add features to a game being played on the gaming machine 2. These devices may include speakers 10 and 12, the display device 45, service light 11 and any other devices. Further, the top box 6 may house different or additional devices not illustrated in FIGS. 1-2B. For example, the top box may include a bonus wheel or a back-lit silk screened panel which may be used to add bonus features to the game being played on the gaming machine. As another example, the top box may include a display for a progressive jackpot offered on the gaming machine. As yet another example, the top box may include a smart card interaction device. During a game, these devices are controlled and powered, at least in part, by circuitry (e.g. a master gaming controller) housed within the main cabinet 4 of the gaming machine 2.

In some implementations, speakers may be mounted and situated in the cabinet with an angled orientation toward the player. For instance, the speakers 10 and 12 located in the top box area 6 of the upper region of gaming machine 2 may be mounted and situated in the cabinet with an angled orientation down towards the player and the floor. In one example, the angle is 45 degrees with respect to the vertical, longitudinal axis of the gaming machine 2. In another example, the angle is in a range of 30-60 degrees. In another example, the angle is any angle between 0 and 90 degrees. In some implementations, the angle of the speakers in the gaming machine may be adjustable. For instance, speakers may be adjusted to face in a direction more closely approximating an estimated position of a player's head or facial features.

The bill validator 30, the player-input switches 32, the display screen 34, and other gaming devices may be used to present a game on the game machine 2. The devices may be controlled by code executed by a master gaming controller housed inside the main cabinet 4 of the gaming machine 2. The master gaming controller may include one or more processors including general purpose and specialized processors, such as graphics cards, and one or more memory devices including volatile and non-volatile memory. The master gaming controller may periodically configure and/or authenticate the code executed on the gaming machine.

In some implementations, the gaming machine may include a sound generating device coupled to one or more sounds cards. The sound generating device may include the one or more speakers or other sound generating hardware and/or software for generating sounds, such as playing music for the primary and/or secondary game or for other modes of the gaming machine, such as an attract mode. The gaming machine may provide dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In some implementations, the gaming machine may include a sensor, such as a camera that is selectively positioned to acquire an image of a player actively using the gaming machine and/or the surrounding area of the gaming machine. The sensor may be configured to capture biometric data about a player in proximity to the gaming machine. The biometric data may be used to implement mechanical and/or digital adjustments to the gaming machine. Alternately, or additionally, the sensor may be configured to selectively acquire still or moving (e.g., video) images. The display devices may be configured to display the image acquired by the camera as well as display the visible manifestation of the game in split screen or picture-in-picture fashion. For example, the camera may acquire an image of the player and a processor may incorporate that image into the primary and/or secondary game as a game image, symbol, animated avatar, or game indicia. In some implementations, the sensor may be used to trigger an attract mode effect. For example, when the sensor detects the presence of a nearby player, the gaming machine may play sound effects or display images, text, graphics, lighting effects, or animations to attract the player to play a game at the gaming machine.

The gaming machine 2 is but one example from a wide range of gaming machine designs on which the techniques described herein may be implemented. For example, not all suitable gaming machines have top boxes or player tracking features. Further, some gaming machines have only a single game display—mechanical or video, while others may have multiple displays.

Keyless Entry into Gaming Machine

Figure 3:
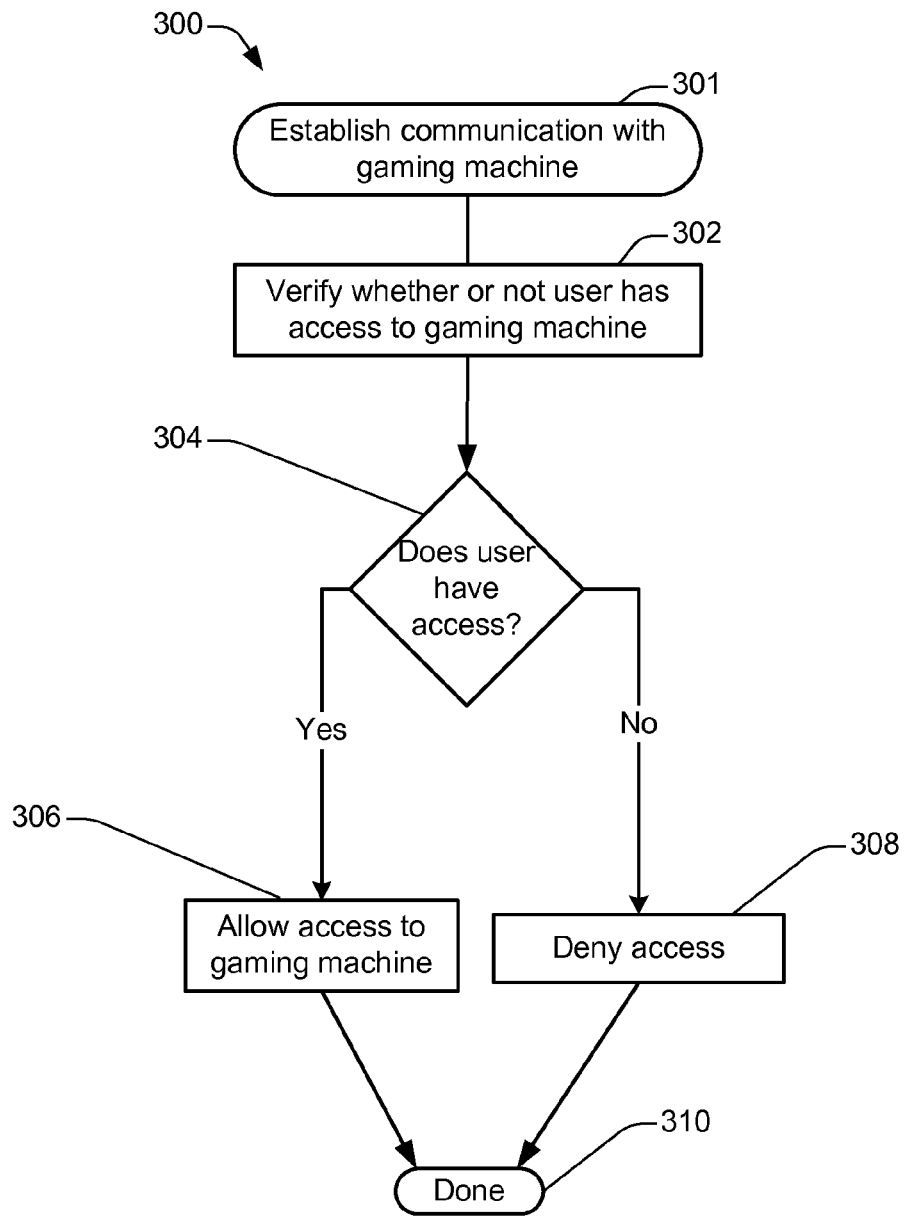
FIG. 3 shows a flow diagram of a method 300 for keyless entry into a gaming machine, performed in accordance with some implementations.

FIG. 3 shows a flow diagram of a method 300 for keyless entry into a gaming machine, performed in accordance with some implementations. The method may be performed with a wireless device (e.g., mobile device 670 in FIG. 6 or wireless device 1200 in FIG. 12) or other some device for gaining keyless access into a gaming machine. In some examples, the wireless device can be a cell phone, a PDA, a personalized computer, or a tablet computer.

Figure 6:
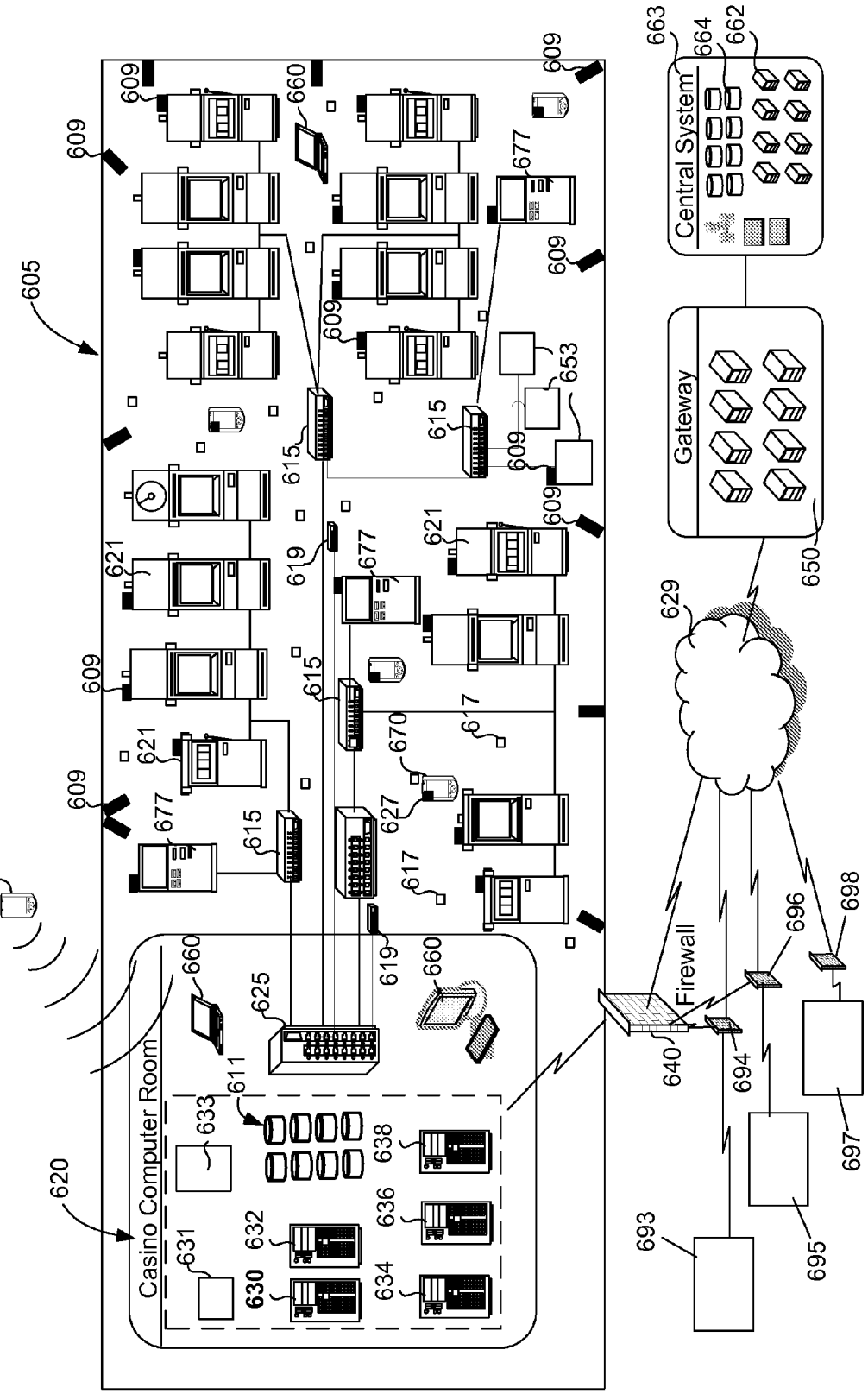
FIG. 6 shows a gaming network, configured in accordance with some implementations.

At 301, communication is first established between a wireless device and a gaming machine or a network server, such as a server 630 shown in FIG. 6. In one example, the wireless device communicates directly with the gaming machine. In another example, keyless entry to the gaming machine is controlled by the network server. Thus the wireless device must connect to the network server.

In some implementations, the communication may be established using RFID, NFC (near field communication), or wireless 802.11 WLAN technology. In some implementations, communication may be established via Bluetooth technology or through existing cell phone networks.

At 302 and 304, it is determined whether the user has access to the gaming machine. "Access," as used herein, may refer to authority or permission to access the gaming machine. If the user is determined to have access, access to the gaming machine is allowed at 306. If the user is determined not to have access, access to the gaming machine is denied at 308. The verification may be done using the gaming machine itself (for isolated gaming machines) or through a network server (for networked gaming machines). Because security is a great concern in the gaming industry, it is important to verify whether a user indeed does have the authorization to access the gaming machine. At this point, the method 300 may be considered complete at 310.

There can be multiple levels of security for different classes of users. For instance, a lower level may be used for a cash drop crew to gain keyless entry into a cash drop door 1140 (FIG. 11) of the gaming machine. The cash drop door may enclose a cash drop cabinet wherein coins, money, tokens, or other forms of wager game currency may be deposited into the gaming machine. The cash drop crew would only have enough authorization to gain access to the cash drop door, but not any other compartment of the gaming machine, such the main cabinet 4 where gaming machine hardware is stored. Advantages for having this keyless entry access to the cash drop door include faster and more efficient cash drops, less interruptions in game play, reduced chances of gaming machine failure due to the fact that the gaming machine is too full to accept any more cash.

In yet another implementation, access to the gaming machine can mean gaining physical access into the main cabinet 4 of the gaming machine in order to fix or check maintenance issues such as reprogramming, clearing errors, rebooting the gaming machine, replacing components, fixing printer jams and bill validator jams, refilling tickets, and replacing malfunctioning hardware. Users who are responsible for maintaining the gaming machine may have a different level of security than users in the cash drop crew.

In some implementations, an application (app) on a smart phone, tablet computer, or any other wireless device facilitates the communication with the gaming machine and the verification of the user's access level. For instance, the app may be used to identify and authenticate the user and to ensure that only authorized users gain access to the gaming machine.

Management of Gaming Machine Via External Device App

Figure 4:
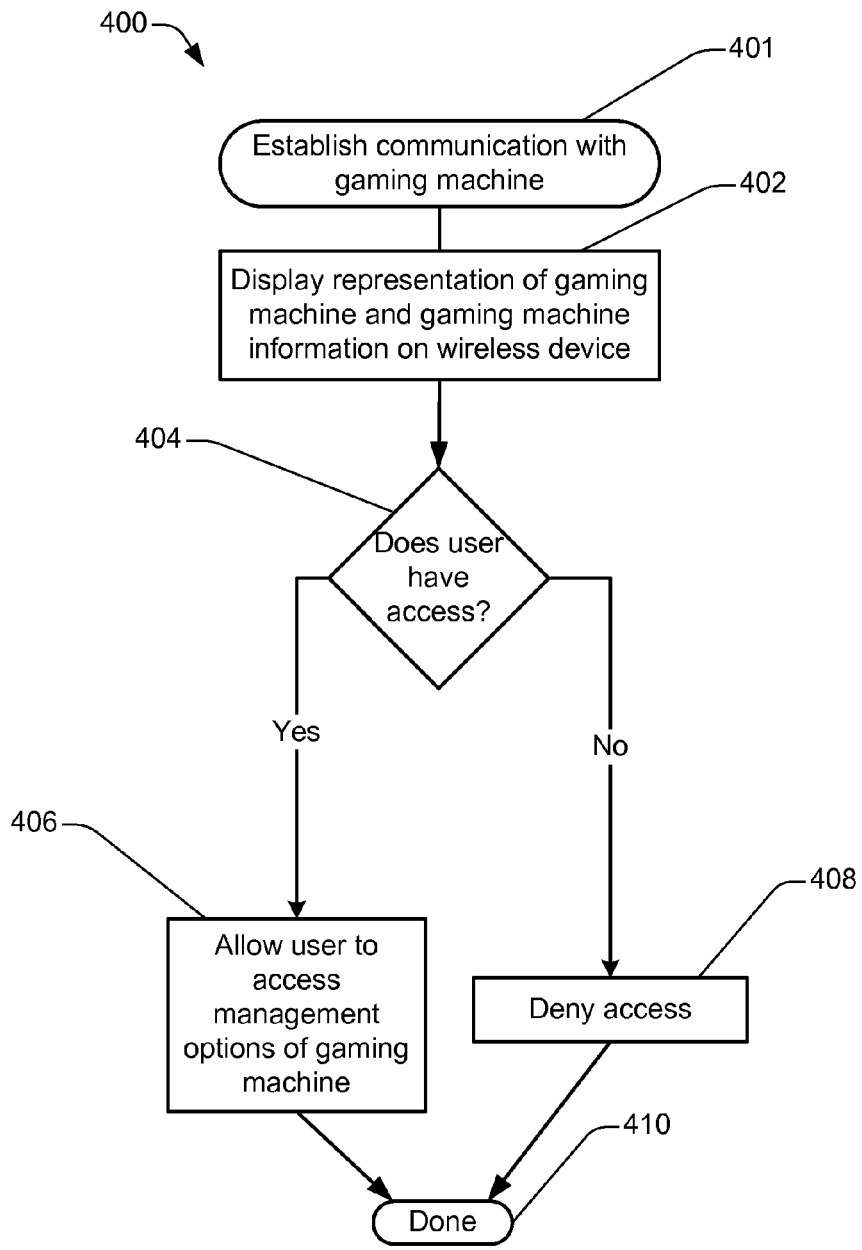
FIG. 4 shows a flow diagram of a method 400 for management of a gaming machine via a wireless device, performed in accordance with some implementations.

In some implementations, the wireless device may provide an interactive interface for managing gaming machines. FIG. 4 shows a flow diagram of a method 400 for accessing management options of a gaming machine, in accordance with some implementations. Similar to FIG. 3, at 401, a communication is established between a wireless device and a gaming machine or a network server.

At 402, the wireless device displays a representation of the gaming machine and gaming machine information on the wireless device. In some implementations, this display can also be in the form of an app on a smart phone, tablet computer, or any other wireless device. While FIG. 4 shows the representation of the gaming machine and gaming machine information being displayed at 402 before verifying whether a user has access at 404, it should be noted that different implementations may implement the steps in different orders. For example, one implementation may verify first whether a user has access before displaying the representation of the gaming machine and gaming machine information. In that particular implementation, if the user has been deemed not to have access, then the wireless device might not display the representation of the gaming machine or some of the gaming machine information.

At 406, if a user is deemed to have access, the user may then access management options of the gaming machine on the wireless device. In some implementations, this can be in the form of a sophisticated secure app on a wireless device maintaining a secure connection with the gaming machine or a network server. Because gaming machines involve the exchange of money, security levels must be high in order for a user to manage a gaming machine on a wireless device. In some implementations, there can be different levels of access for different classes of casino personnel having different levels of security clearance. At the highest level of access, all of the management options may be available. At lower levels of access, only some of the management options may be available. If the user is deemed not to have access at 404, access to the management options is denied at 408. At this point, the method 400 may be considered complete at 410.

In some implementations, the management options of a gaming machine may provide, by way of example only: ticket printing, service light clearing or testing, gaming machine resetting or rebooting, remote shut down, remote out of service switching, button controller reset, display adjustments, performance testing, and interactive information displays.

Ticket printing involves printing a ticket by the gaming machine via the wireless device. Ticket content ranges from monetary value (take it to the casino cage to cash it) to coupons and such for buffets or other casino amenities. One common task that an administrator may perform is ticket reprinting. Ticket reprinting involves invalidating a previously printed ticket and replacing it with a new ticket. In some instances, patrons require a new ticket with the same monetary value as the previously printed ticket. For instance, if a patron spilled a drink and ruined the ticket, he might alert an administrator. The administrator may then use the wireless device to access the management options of the gaming machine that printed the previously printed ticket. The administrator may, utilizing the management options, invalidate the previously printed ticket and direct the gaming machine to print the new ticket.

Service light clearing or testing involves determining an error that is causing the service light (e.g., the service light 11 shown in FIG. 1) to illuminate. In some implementations, the management options may provide an administrator or technician with sufficient information to determine whether the error may be cleared remotely or whether an in-person solution is required. Gaming machines often include a physical "reset key" that gives technicians access to administrator menus on the gaming machine for performing tasks such as clearing errors that cause the service light to illuminate. In some implementations, the management options of the gaming machine on the wireless device present a software version of the "reset key." Furthermore, some or all of the functions provided by the administrator menus on a gaming machine may be provided by the wireless device, after access to the management options of the gaming machine has been granted.

Gaming machine reset or reboot allows a technician or administrator to reboot the gaming machine via the wireless device. Conventional gaming machines often include a physical power switch locked inside the main cabinet. If a reboot is required, a technician must open the main cabinet, turn the switch off, then on again. There are gaming regulations regarding when, how, why, etc. a game has to be rebooted. Those of skill in the art will appreciate that the management options may allow rebooting of the gaming machine via the wireless device in accordance with any gaming regulations. In some implementations, similar techniques may be used to shut down a powered up gaming machine or to power up a shutdown gaming machine.

Remote out of service switching allows a technician or administrator to put the gaming machine in an "out of service mode," as required by various regulations, via the wireless device. In the out of service mode, the gaming machine may display a message indicating that the gaming machine is out of service. The gaming machine will also disallow any player inputs. One example of when a gaming machine would be put out of service is so that maintenance may be performed on the gaming machine. For instance, gameplay or peripheral software may be updated. In some implementations, the gameplay or software updates may also be performed by the technician via the wireless device.

Button controller reset allows a technician or administrator to reset hardware controllers responsible for control devices that need to be loaded with code to function. Examples of such control devices may include electromechanical devices (tracking balls, wheels, reels, etc.) and dynamic buttons (such as buttons displayed on a LCD with touch screen capability). Conventional gaming machines have a dedicated physical switch responsible for enabling hardware controller resets. The management options may be configured to perform a similar function to the physical switch. In some implementations, the management options may further include an interactive display of information regarding installed and available controllers in the gaming machine so that the technician or administrator may control resets at the individual controller level.

Performance testing allows a technician or administrator to check and maintain the performance of any component of the gaming machine via the wireless device. For instance, the wireless device may be given access to a gaming machine's cyclic redundancy check (CRC) software. The CRC software may be used to verify the authenticity or version of the gaming machine's software or firmware. In another example, the management options may allow the wireless device to put hardware components into a test mode. For instance, trim lights that are used to attract customers with dancing light patterns may be put into a test mode to ensure that they are lighting up correctly.

Similar techniques may be used to perform display adjustments on the gaming machine. For instance, gaming machine displays typically need size and position adjustments when being installed. In some implementations, the management options may also provide brightness, contrast, and other video display adjustments via the wireless device. In another example, the management options may provide performance testing for any of the peripheral devices discussed above with reference to FIGS. 1, 2A and 2B.

Any or all of the example functionality described above may be implemented via an interactive information display. The interactive information display may be provided by the management options of the gaming machine on the wireless device. The interactive information displays allow a user, such as a manager or administrator, to monitor the status of the gaming machine and its components and to perform maintenance responsive to the status, remotely via the wireless device or otherwise.

Casino Floor Management App

Figure 5:
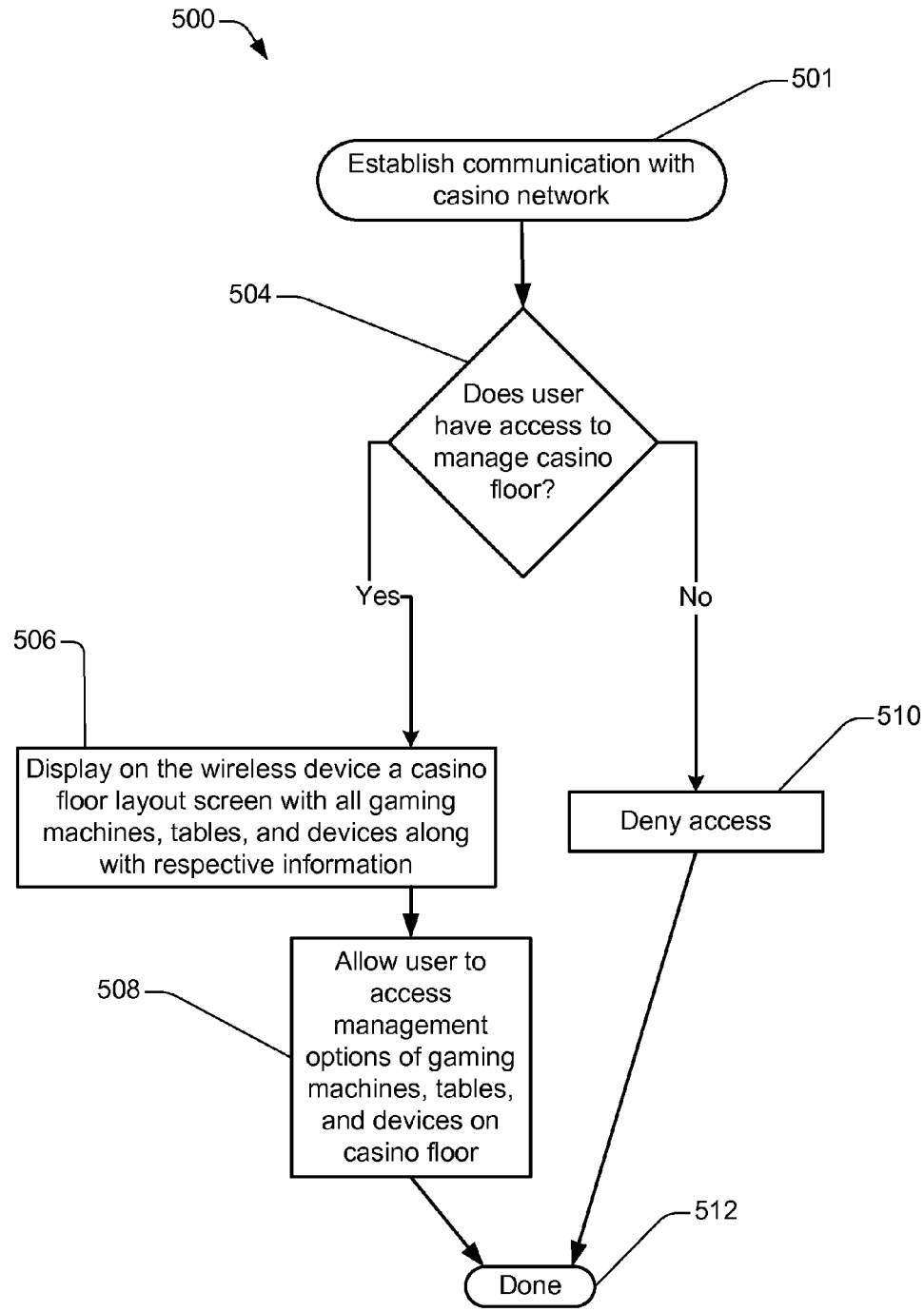
FIG. 5 shows a flow diagram of a method 500 for management of a casino floor via a wireless device, performed in accordance with some implementations.

In some implementations, the wireless device may provide an interactive interface for managing a casino floor. FIG. 5 shows a flow diagram of a method 500 for managing a casino floor, in accordance with some implementations. In some implementations, a casino floor includes gaming machines, tables, and devices. In the gaming industry, it would be advantageous for a casino manager or pit boss to keep track and manage the different gaming machines, tables, and devices on the casino floor with just a wireless device. At 501, communication is established with a gaming machine or a network server. At 504, it is determined whether a user has access to manage a casino floor.

At 506, if it is determined that the user has access, the wireless device will then display a casino floor layout screen. In some implementations, this display can be in the form of an app on a wireless device. At 508, the user is given access to manage the gaming machines, tables, and devices on the casino floor. If it is determined that the user does not have access, access to the casino floor layout screen is denied at 510. At this point, the method 500 may be considered complete at 512.

In some implementations, there can be different levels of security for different levels of casino floor management. Examples of security levels from highest to lowest include, administrators, pit bosses, casino technicians, and cash drop crews.

In some implementations, this method can work in conjunction with the method of accessing management options of a gaming machine. For instance, an app on a wireless device may display the layout of the casino floor along with representations and locations of gaming machines, tables, and devices on the casino floor. Depending on the level of security access accessible by the user, certain ones of the gaming machines, tables, and devices on the casino floor may be individually accessed and managed by the user. In one example, this may be performed by selecting a representation of a gaming machine, table, or device on the layout of the casino floor. Once certain ones of the gaming machines, tables, and devices have been individually accessed by the user, the method for accessing management options of a gaming machine as described in FIG. 4 can be utilized.

In some implementations, the interactive interface for managing a casino floor further includes drop and drop capability. For instance, a user may drag and drop certain configurations or settings from a first gaming machine displayed on the layout of the casino floor to a second gaming machine displayed on the layout. Performing such an action is a streamlined method for transferring configurations on one gaming machine to a second gaming machine.

FIG. 6 shows a gaming network, configured in accordance with some implementations and will be discussed in more detail later in the application.

In Casino Location Services

Figure 7:
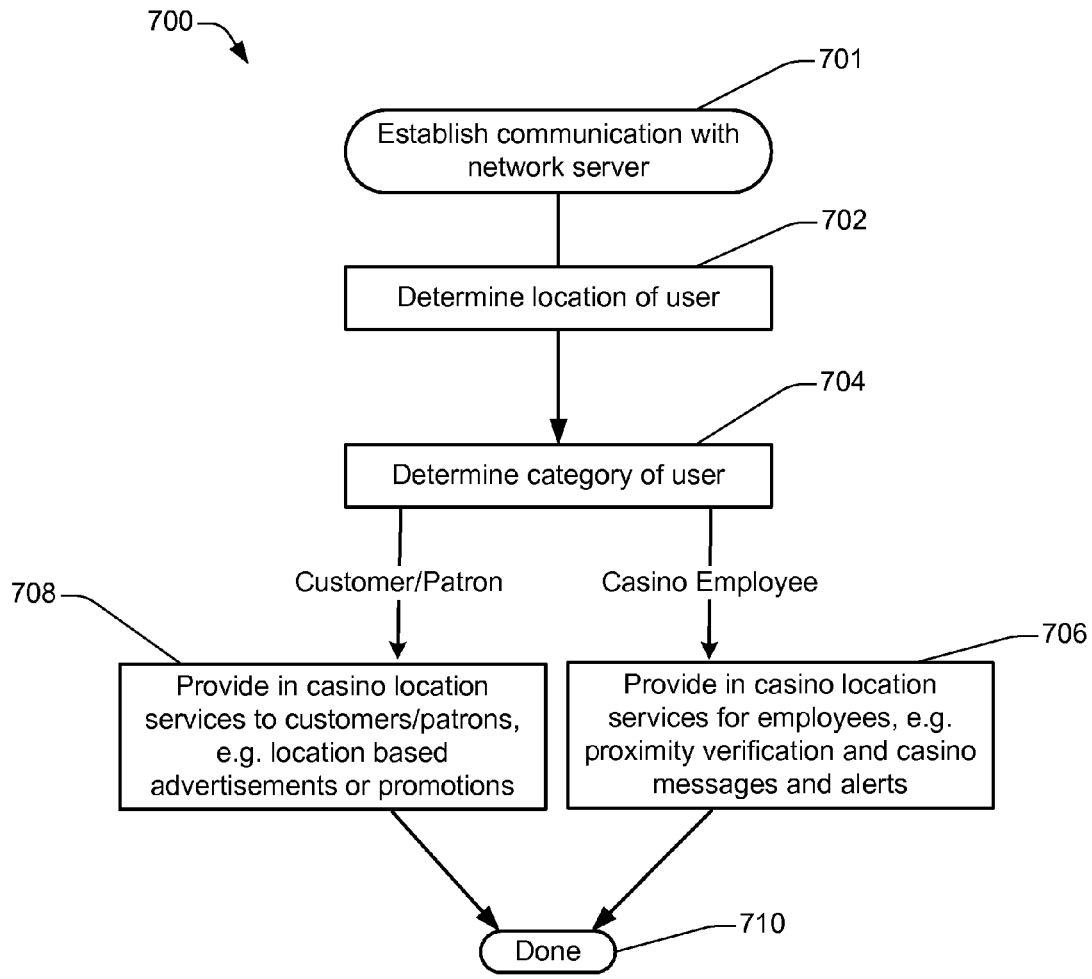
FIG. 7 shows a flow diagram of a method 700 for providing in casino location services, performed in accordance with some implementations.

In some implementations, the location of the wireless device may be tracked and used to provide various location-based services to the user of the wireless device. FIG. 7 shows a flow diagram of a method 700 for providing in casino location services, performed in accordance with some implementations. At 701, communication is established with a wireless device and a network server. It should be noted that in some implementations, communication could also be established with a gaming machine instead of a network server.

At 702, the location of the user is determined. In some implementations, location can be determined using Wi-Fi technology, GPS, or cell tower triangulation. In some implementations, location can be determined using the same method of communication as described elsewhere in the specification, for example, with reference to the keyless entry technique of FIG. 3. Still in other implementations, location is determined by determining which gaming machine the user is nearest and/or with which gaming machine the user's wireless device has established communication.

In some implementations, a category for the user is determined at 704. In some implementations, one category of user is customer or patron. In some implementations, at 708, once the category of the user has been determined to be customer or patron, in casino location services are provided. In some implementations, for customers or patrons, the in casino location services include, but are not limited to, proximity based advertising, gaming information, and user customizable alerts. An example of such a service can be an alert to a customer that a jackpot is due in the proximity of the customer. Another example of such a service can be in the form of a notice to the customer regarding the operational status of nearby gaming machines. For instance, the notice may indicate that a gaming machine is out of service, locked down or otherwise unplayable. Still another example of such a service could be in the form of a special promotion offered to customers for certain gaming machines in the area.

In some implementations, at 706, once the category of the user has been determined to be casino employee, in casino location services are provided. In some implementations, for casino employees, in casino location services include, but are not limited to, proximity verification, proximity based maintenance and security alerts, and user/employee tracking. At this point, the method 700 may be considered complete at 710.

In some implementations, proximity verification can work in conjunction with keyless entry into a gaming machine as described earlier in the application. For example, proximity verification can allow for higher level management or floor management software to verify whether a user, i.e. a casino technician, is physically within a certain proximity before allowing the user to gain access into the gaming machine.

In some implementations, automated maintenance and security alerts can be dispatched using the in casino location services to the nearest casino technician or casino employee available in the area. In this fashion, in casino location services greatly reduces the response time for technical issues or security problems.

In some implementations, in casino location services can also be used by higher level management to keep track of employees and manage the floor more effectively.

Lockdown Button

Lockdown refers to a security action that places the gaming machine out of service, temporarily out of order, and other such actions. In some implementations, the wireless device may provide a virtual lockdown button for the gaming machine. Such functionality may be implemented, for instance, via the management options of the gaming machine discussed above with reference to FIG. 3.

Figure 8:
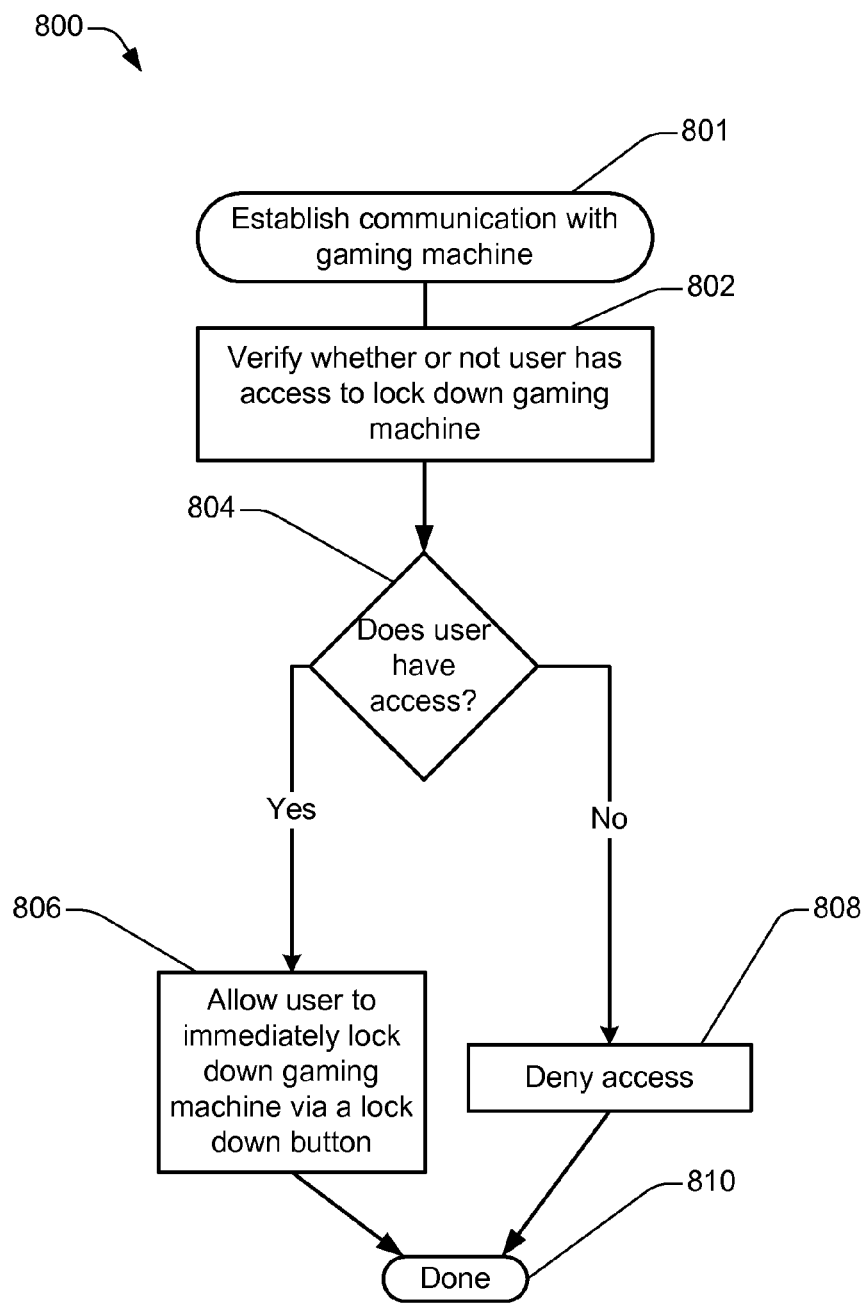
FIG. 8 shows a flow diagram of a method 800 for locking down a gaming machine via a wireless device, performed in accordance with some implementations.

FIG. 8 shows a flow diagram of a method 800 for locking down a gaming machine, performed in accordance with some implementations. At 801, communication is established between a user's wireless device and a gaming machine or a network server. At 802 and 804, it is determined whether the user has access to lock down the gaming machine. If the user has access, then the user is allowed to lock down the gaming machine via a lock down button on the wireless device at 806. If the user does not have access, the user is not allowed to lock down the gaming machine at 808. At this point, the method 800 may be considered complete at 810.

In some implementations, the lock down button need not be on a wireless device. For example, the lock down button could be achieved on a computing device connected to the casino network anywhere in the casino. In addition, the lock down button can be on the gaming machine itself or any external device in communication with the gaming machine.

In some implementations, the lock down button can be implemented in software on the wireless device or an app on the wireless device. The lock down button can be either an actual physical button or a virtual button (e.g., a video graphic button displayed on a touch screen) on a gaming machine or a wireless device.

In some implementations, lock down may refer to a single security action or a set of security actions that could range from minor to severe. In some implementations, the lock down actions could be programmable and customizable to a user's needs and/or jurisdictional requirements. For example, in some implementations, lock down can refer to placing the gaming machine in an unplayable state. In some implementations, lock down can refer to restricting keyless entry access for a determined amount of time. In some implementations, lock down may be used to stop a security violation, such as improper tampering with the gaming machine. For instance, lock down may stop game play on the gaming machine. Visual alarms, such as flashing lights, and audio alarms may also be set off when the gaming machine is locked down for security reasons.

In some implementations, the lock down button can refer to different levels of lock down depending on the security level access of the user. For example, a casino technician could possibly have access to lock down a gaming machine as temporarily out of order due to mechanical issues. However, the casino technician would probably not have enough security access to lock down a gaming machine for other management or security reasons, but a casino administrator might have the authority to do so. In some implementations, the lock down button can lock down one gaming machine or multiple gaming machines at once, assuming the user has sufficient access to do so.

In some implementations, the network server or gaming machines may be configured to detect triggering events. One instance of a triggering event includes when one of the cabinets of the gaming machine has been opened without proper authorization. In such a case, the gaming machine may send a message to the network server, and the network server may respond with an indication to lock down the gaming machine. In another example, the gaming machine may determine lock down itself without communication with the network server. Here, the gaming machine may send a message or alert to the network server after lock down.

In some implementations, the state of the gaming machine prior to lock down is stored in a non-volatile memory. The non-volatile memory may be located in the gaming machine or on a network server. This may be useful, for example, when the gaming machine is being locked down to prevent unauthorized tampering or hacking into the gaming machine to alter the wager game in any way. Once the state of the gaming machine is stored in the non-volatile memory, the gaming machine may be shut down or otherwise rendered inoperable for a determined period of time. An administrator, technician, or other operator may then use the data stored in the non-volatile memory to determine the state of the gaming machine before lock down for maintenance or investigatory purposes. Upon unlocking the gaming machine, the state of the gaming machine may be reconstructed from the data in the non-volatile memory, allowing game play to continue at the state prior to lock down.

Digital Log Book

A digital log book may be used to track the various events on the gaming machine. Qualifying entry events can include, but are not limited to, maintenance tasks, gaming machine accesses, and cash drops. Furthermore, any configurations or maintenance tasks performed with the management options of the gaming machine may be logged in the digital log book. Gaming machines and network servers may each have individual digital log books. In some implementations, the digital log book is stored in a memory of each gaming machine, such as a memory 1190 of the example gaming machine 1100 shown in FIG. 11. In other implementations, one or more network servers may store the digital log book for one or more gaming machines.

In some implementations, the wireless device may provide access to the digital log book of a gaming machine. Such functionality may be implemented, for instance, via the management options of the gaming machine discussed above with reference to FIG. 3. By using similar techniques, the wireless device may also provide access to the digital log book of a network server.

Figure 9:
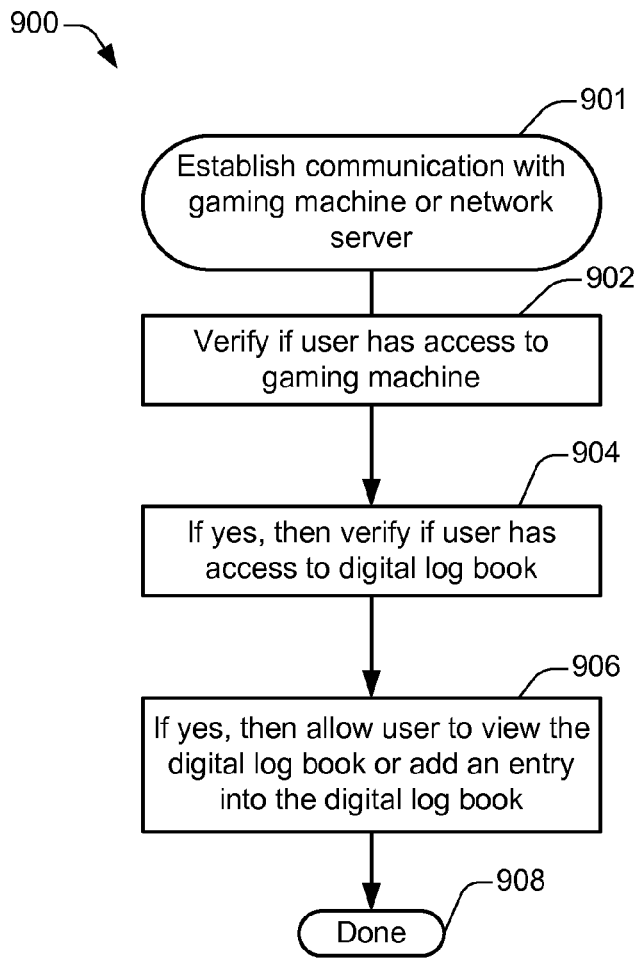
FIG. 9 shows a flow diagram of a method 900 for implementing a digital log book, performed in accordance with some implementations.

FIG. 9 shows a flow diagram of a method 900 for implementing a digital log book, performed in accordance with some implementations. At 901, a communication is established with a gaming machine or a network server. For instance, a user may request access to the digital log using the wireless device. At 902, it is determined whether the user has access to the gaming machine. At 904, it is determined whether the user has access to the digital log book. At 906, if it is verified that the user has access to the digital log book, the user is allowed to access, view or write to the digital log book. At this point, the method 900 may be considered complete at 908.

In some implementations, the digital log book is protected by high levels of security in order to maintain the integrity of the log events and entries. In some implementations, modifying and/or deleting entries may require a higher security clearance level than the security clearance level required to add entries or to view entries.

In some implementations, the digital log book can be tied to keyless entry systems. For instance, an entry to the digital log book may be added each time keyless entry to the gaming machine is requested or granted. In some implementations, the gaming machine may be further configured to add entries in the log book upon any qualifying entry event. In some implementations, the digital log book can be customizable or upgradable according to the user's preferences. Any of the functionalities described with reference to FIGS. 3-10 may be recorded in the digital log book.

Keyless Entry and in Casino Location Services Via Digital Camera

Figure 10:
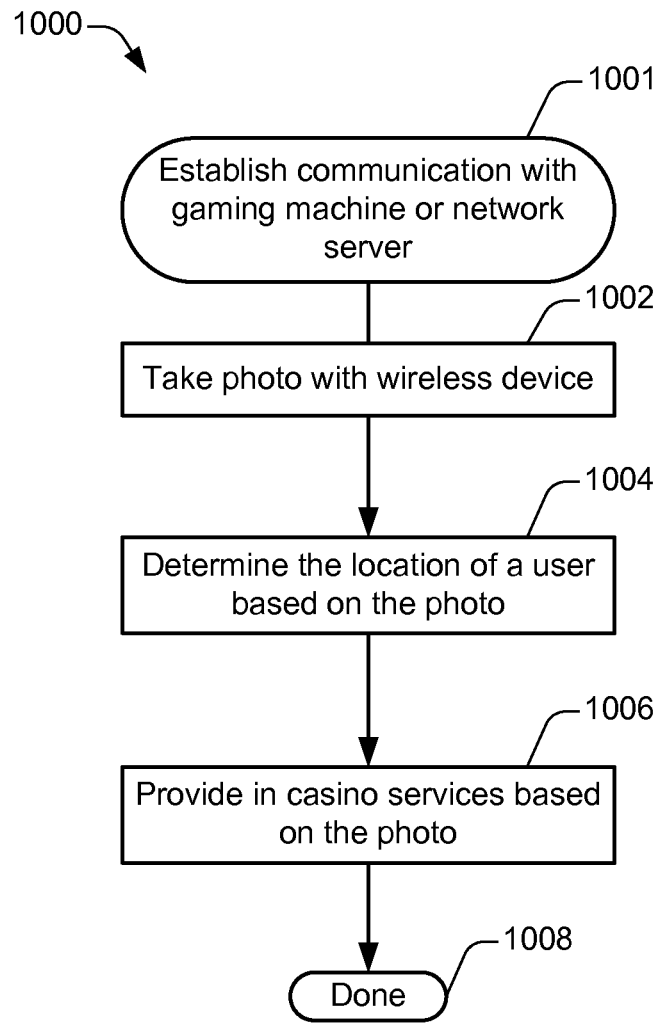
FIG. 10 shows a flow diagram of a method 1000 for utilizing a camera for in casino services, performed in accordance with some implementations.

In some implementations, the keyless entry and in casino location services described above with reference to FIGS. 3 and 7 above may be implemented with the use a digital camera located on the wireless device. FIG. 10 shows a flow diagram of a method 1000 for providing in casino location services via the digital camera. At 1001, a wireless device establishes a communication with a gaming machine or network server.

At 1002, a user takes a digital image (photograph) with a digital camera on the wireless device. The digital image is then uploaded to the gaming machine or to the network via a network server. At 1004, the location of the user is determined based on the digital image uploaded. At 1006, in casino location services are provided based on the digital image or the location of the user as determined based on the digital image. At this point, the method 1000 may be considered complete at 1008.

In some implementations, the method 1000 is performed via an app or other software program on the wireless device. In some implementations, the digital image taken is automatically uploaded to the gaming machine or network server upon being taken by the user. In some implementations, the app or other software program on the wireless device utilizes the original camera functions of the wireless device and additionally adds on an extra layer of security and protocol in order to establish a connection with the gaming machine or casino network. Alternatively, the app or software program can connect to the Internet and digital images can be uploaded to the Internet to be utilized by the casino. In some implementations, the app or software program would connect to a dedicated web-portal, e.g. a web-portal developed and dedicated specifically to gaming.

In some implementations, in casino location services using the digital image can include all of the in casino services described earlier in the application. Additionally, in some implementations, in casino location services can include allowing a user, such as a technician, to take a digital image of the serial tag of the gaming device in order to gain access to device entry or information menus available. In some implementations, a user may submit a machine trouble ticket along with a digital image of the gaming machine in order to better describe the issue. In some implementations, a user, such as a customer, may be allowed to review a gaming machine. The digital image taken would initiate the review and pattern recognition software might allow the app or software program to recognize the gaming device in the digital image in order to attribute the correct review to the correct gaming device. In some implementations, the user may be allowed to take a digital image of the user's surroundings and the pattern recognition software can be used to determine the location of the user. In some implementations, once the location has been determined, the app or software program may allow the user to utilize an in casino map, directions, and up to date location information similar to GPS but within the casino, possibly over the casino's secure network. In some implementations, the app or software program can use the digital camera feature for user participation in casino scavenger hunts and/or other challenges and reward systems.

As mentioned above, in some implementations, the app or software program can utilize the camera for facilitating keyless entry into a gaming machine. For instance, the digital camera can be used to take a photo to start the keyless entry process. The digital camera could be used to verify that the user is within the vicinity.

Components of a Gaming Machine and Wireless Device

Figure 11:
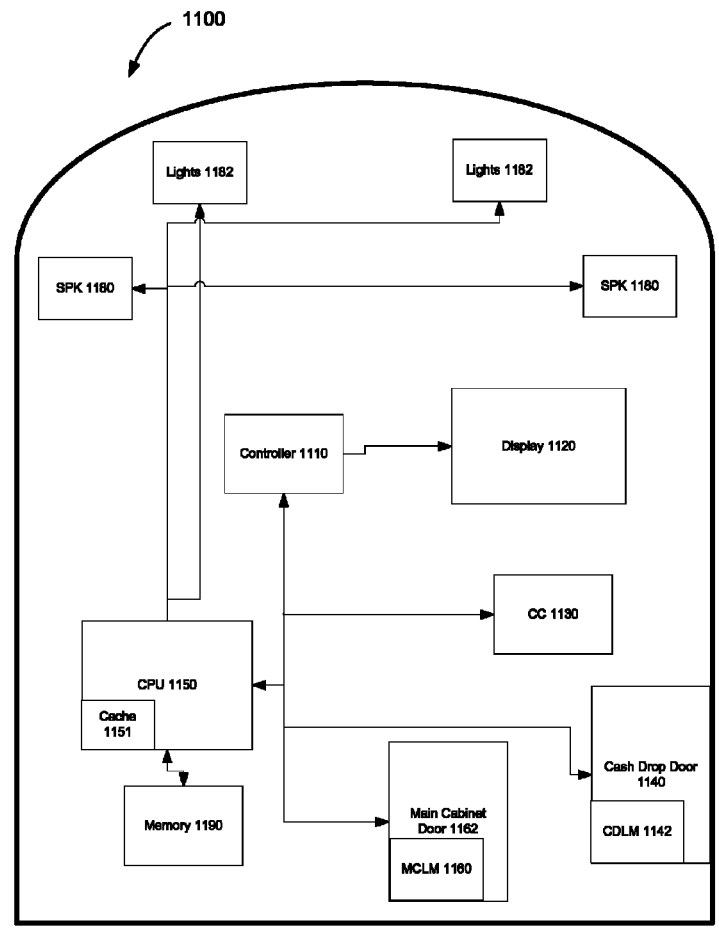
FIG. 11 shows a perspective diagram of the component parts of a gaming machine, configured in accordance with some implementations.

FIG. 11 shows a gaming machine and its component parts, configured in accordance with some implementations. A gaming machine 1100 may include a controller 1110 configured to provide communications between a display 1120, a communication component ("CC") 1130, a CPU 1150, a main cabinet door 1162 and a cash drop door 1140. The display 1120 is configured to display a user and communication interface. The communication component 1130 is configured to communicate directly with a wireless device (e.g., wireless device 1200 shown in FIG. 12) or a network server (e.g., server 630 shown in FIG. 6). The CPU 1150 with a cache 1151 is an example of the one or more processors configured to perform the functions described earlier in the application. The CPU 1150 works in conjunction with the communication component 1130 and the controller 1110 to establish keyless entry access into the gaming machine. Once keyless access has been granted, a main cabinet locking mechanism ("MCLM") 1160 unlocks, allowing access to the main cabinet door 1162. As discussed above, the main cabinet door 1162 prevents unauthorized access to the main cabinet 4 of the gaming machine wherein gaming machine hardware is stored. The keyless entry system can also allow access to a cash drop door ("CDD") 1140 via a cash drop locking mechanism ("CDLM") 1142. The gaming machine, as discussed, may include speakers ("SPK") 1180, lights 1182, and a memory 1190.

Figure 12:
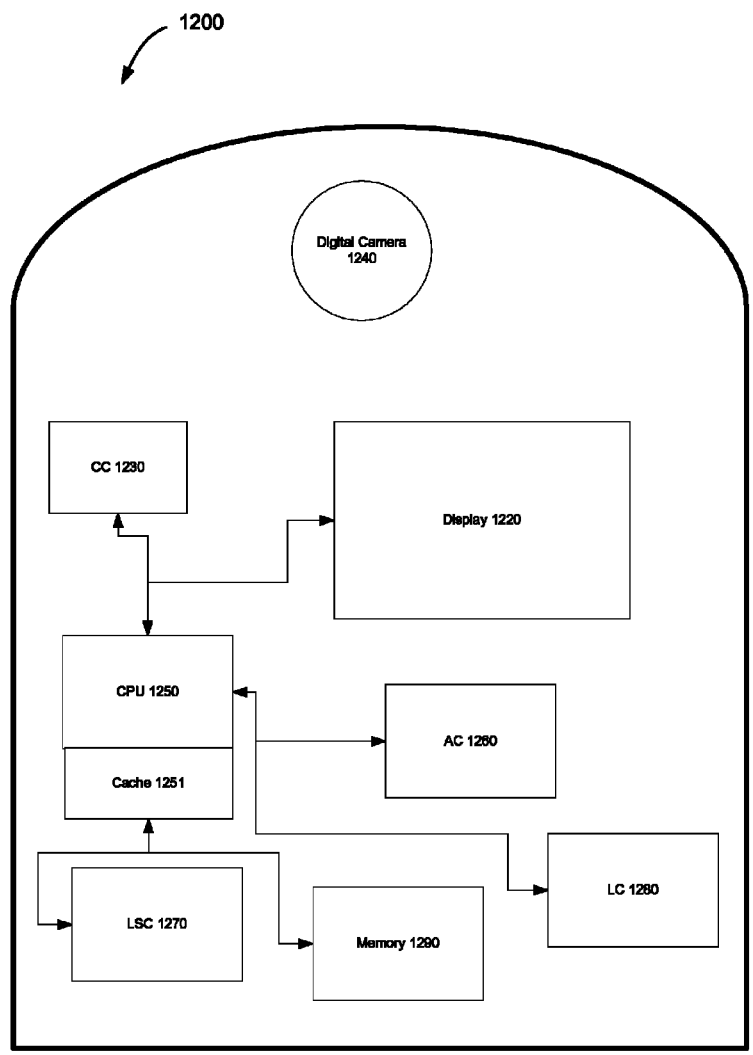
FIG. 12 shows a perspective diagram of the component parts of a wireless device, configured in accordance with some implementations.

FIG. 12 shows a wireless device and its component parts, in accordance with some implementations. The wireless device 1200 includes a CPU 1250 with a cache 1251. The CPU 1250 is in communication with a communication component ("CC") 1230 and an authorization component ("AC") 1260. In some implementations, the authorization component 1260 is implemented in software run on the CPU 1250. User interface and apps are displayed on a display 1220. A location service component ("LSC") 1270 can also be in communication with the CPU 1250. In some implementations, the location service component 1270 may be implemented in software on the CPU 1250. The wireless device 1200 also includes a linking component ("LC") 1280 in communication with the CPU 1250. In some implementations, the linking component 1280 can be in the form of a wireless connection. The wireless device 1200 also includes a memory 1290 and a digital camera 1240. As discussed, the wireless device may in various examples be a cell phone, a smart phone, a tablet computer, a PDA, a personal computer, or a laptop computer.

Gaming Network

FIG. 6 shows a gaming network, configured in accordance with some implementations. Those of skill in the art will realize that this architecture and the related functionality are merely examples and that the present disclosure encompasses many other such implementations and methods.

In FIG. 6, a casino computer room 620 and networked devices of a gaming establishment 605 are illustrated. The gaming establishment 605 may be configured for communication with a central system 663 via a firewall 640, a network 629, and a gateway 650. Gaming establishments 693, 695 and 697 may contain some or all of the features of the gaming establishment 605. Furthermore, the gaming establishments 693, 695 and 697 may also be configured for communication with the central system 663 via firewalls 694, 696 and 698 respectively and via the network 629.

In some implementations, gaming establishments may be configured for communication with one another. In this example, gaming establishments 693 and 695 are configured for communication with the casino computer room 620. Such a configuration may allow devices and/or operators in the gaming establishment 605 to communicate with and/or control devices in other casinos. In some such implementations, a server (e.g., the server 630) in the casino computer room 620 may control devices in the gaming establishment 605 and devices in other gaming establishments. Conversely, devices and/or operators in another gaming establishment may communicate with and/or control devices in the gaming establishment 605.

For example, the server 630 may be provisioned with relatively more advanced software (e.g., 3-D facial recognition software) for patron identification than servers of other networked locations. Such a server may process patron identification requests from devices in gaming establishment 605 as well as patron identification requests from devices in gaming establishments 693 and 695.

The gaming establishment 697 is configured for communication with the central system 663, but is not configured for communication with other gaming establishments. Some gaming establishments (not shown) may not be in communication with other gaming establishments or the central system 663.

The gaming establishment 605 further includes multiple gaming machines 621, each of which is part of a bank of gaming machines 621. In the example shown in FIG. 6, the gaming establishment 605 also includes a bank of networked gaming tables 653. However, the present disclosure may be implemented in gaming establishments having any number of gaming machines, gaming tables, etc. It will be appreciated that many gaming establishments include hundreds or even thousands of gaming machines 621 and/or gaming tables 653, not all of which are necessarily included in a bank and some of which may not be connected to a network. At least some of the gaming machines 621 and/or the mobile device 670 (e.g., the wireless device 1200 in FIG. 12) may be "thin clients" that are configured to perform client-side methods as described elsewhere herein.

Some of the gaming machines or mobile devices can provide automated, multi-player roulette, blackjack, baccarat, and other table games. The table games may be conducted by a dealer and/or by using some form of automation, which may include an automated roulette wheel, an electronic representation of a dealer, etc. In some such implementations, devices such as cameras, radio frequency identification devices, etc., may be used to identify and/or track playing cards, chips, etc. Some of gaming tables 653 may be configured for communication with individual player terminals (not shown), which may be configured to accept bets, present an electronic representation of a dealer, indicate game outcomes, etc.

The gaming establishment 605 also includes networked kiosks 677. Depending on the implementation, the kiosks 677 may be used for various purposes, including but not limited to cashing out, prize redemption, redeeming points from a player loyalty program, redeeming "cashless" indicia such as bonus tickets, smart cards, etc. In some implementations, the kiosks 677 may be used for obtaining information about the gaming establishment, e.g., regarding scheduled events (such as tournaments, entertainment, etc.), regarding a patron's location, etc. Software related to such features may be provided and/or controlled, and related data may be obtained and/or provided, according to the present disclosure. For example, in some implementations of the disclosure, the kiosks 677 may be configured to receive information from a patron, e.g., by presenting graphical user interfaces.

Also as shown in FIG. 6, each bank of gaming machines has a corresponding switch 615, which may be a conventional bank switch in some implementations. Each switch 615 is configured for communication with one or more devices in the casino computer room 620 via a main network device 625, which combines switching and routing functionality. Although various communication protocols may be used, some preferred implementations use the Gaming Standards Association's G2S Message Protocol. Other implementations may use International Game Technology's (IGT) open, Ethernet-based SuperSAS® protocol, which IGT makes available for downloading without charge. Still other protocols, including but not limited to Best of Breed ("BOB"), may be used to implement various examples of the disclosed subject matter. IGT has also developed a gaming-industry-specific transport layer called CASH that rides on top of Transmission Control Protocol/Internet Protocol (TCP/IP) and offers additional functionality and security.

The gaming establishment 605 also includes a radio-frequency identification (RFID) network, implemented in part by RFID switches 619 and multiple RFID readers 617. An RFID network may be used, for example, to track objects (such as mobile device 670, which include RFID tags 627 in one example), patrons, etc., in the vicinity of the gaming establishment 605.

As noted elsewhere herein, some implementations of the disclosure may involve "smart" player loyalty instruments, such as player tracking cards, which include an RFID tag. Accordingly, the location of such RFID-enabled player loyalty instruments may be tracked via the RFID network. In FIG. 6, the mobile device 670 may include an RFID tag 627 which includes encoded identification information for the mobile device 670. Accordingly, the locations of the tagged mobile device 670 may be tracked via the RFID network in gaming establishment 605. Other location-detection devices and systems, such as the global positioning system ("GPS"), may be used to monitor the location of people and/or devices in the vicinity of the gaming establishment 605 or elsewhere.

Various alternative network topologies can be used to implement different examples of the disclosure and/or to accommodate varying numbers of networked devices. For example, gaming establishments with large numbers of gaming machines 621 may require multiple instances of some network devices (e.g., of main network device 625, which combines switching and routing functionality in this example) and/or the inclusion of other network devices not shown in FIG. 6. Some implementations of the disclosure may include one or more middleware servers disposed between kiosks 677, RFID switches 619 and/or bank switches 615 and one or more devices in the casino computer room 620 (e.g., a corresponding server). Such middleware servers can provide various useful functions, including, but not limited to, the filtering and/or aggregation of data received from switches, from individual gaming machines and from other devices. Some implementations of the disclosure include load-balancing methods and devices for managing network traffic.

Storage devices 611, the server 630, License Manager 631, arbiter 633, servers 632, 634, 636 and 638, host device(s) 660 and main network device 625 are disposed within the casino computer room 620 of gaming establishment 605. In practice, more or fewer devices may be used. Depending on the implementation, some such devices may reside in gaming establishment 605 or elsewhere. These servers or devices may operate to, but are not limited to, provide for the implementation of tasks specific to the present disclosure in conjunction with devices such as the wager gaming machines 621 and the mobile device 670. For example, the mobile device 670 may connect with the server 630 and receive the management options for a gaming machine via a user interface provided by the server 630. In another example, the server 630 provides to the wireless device management options for a plurality of gaming machines by also providing the casino floor management application and the casino floor layout screen discussed above with reference to FIG. 5.

One or more devices in the central system 663 may also be configured to perform, at least in part, tasks specific to the present disclosure. For example, one or more servers 662 and/or one or more storage devices 664 may be configured to provide to the management options of a gaming machine discussed above with reference to FIG. 4.

One or more of the servers of the casino computer room 620 may be configured with software for receiving a player's wager gaming notification parameters, determining when a wagering condition corresponds with the wager gaming notification parameters and/or providing a notification to the player when the wagering condition corresponds with the wager gaming notification parameters. Moreover, one or more of the servers may be configured to receive, process and/or provide image data from casino floor cameras 609, to provide navigation data to patrons (e.g., to indicate the location of and/or directions to a gaming table, a wager gaming machine, etc., associated with a wager gaming notification), etc.

For example, navigation data (which may include map data, casino layout data, camera image data, etc.) may be provided by one or more of the servers of the casino computer room 620 to the mobile device 670. Some implementations of the present disclosure include, as noted, a plurality of networked cameras 609, which may be video cameras, smart cameras, digital still cameras, etc. In some such implementations, such cameras may provide, at least in part, real-time navigation.

Other devices that may be deployed in the gaming network do not appear in FIG. 6. For example, some gaming networks may include not only various radio frequency identification ("RFID") readers 617, but also RFID switches, middleware servers, etc., some of which are not depicted in FIG. 6. These features may provide various functions. For example, a server (or another device) may determine a location of a mobile device 670 according to the location of an RFID reader that reads an RFID tag 627.

The servers and other devices indicated in FIG. 6 may be configured for communication with other devices in or outside of the gaming establishment 605, such as the host devices 660, the kiosks 677 and/or the mobile device 670, for implementing some methods described elsewhere herein. Servers (or the like) may facilitate communications with such devices, receive and store patron data, provide appropriate responses, etc., as described elsewhere herein.

Some of these servers may be configured to perform tasks relating to accounting, player loyalty, bonusing/progressives, configuration of gaming machines, etc. One or more such devices may be used to implement a casino management system, such as the IGT Advantage™ Casino System suite of applications, which provides instantaneous information that may be used for decision-making by casino managers. A Radius server and/or a DHCP server may also be configured for communication with the gaming network. Some implementations of the disclosure provide one or more of these servers in the form of blade servers.

Some implementations of the server 630 and the other servers shown in FIG. 6 include (or are at least in communication with) clustered CPUs, redundant storage devices, including backup storage devices, switches, etc. Such storage devices may include a "RAID" (originally redundant array of inexpensive disks, now also known as redundant array of independent disks) array, back-up hard drives and/or tape drives, etc.

In some implementations, many of these devices (including but not limited to the License Manager 631, the servers 632, 634, 636, and 638, and the main network device 625) are mounted in a single rack with the server 630. Accordingly, many or all such devices will sometimes be referenced in the aggregate as an "Sb™ server." However, in alternative implementations, one or more of these devices is in communication with the server 630 and/or other devices of the network but located elsewhere. For example, some of the devices could be mounted in separate racks within the casino computer room 620 or located elsewhere on the network. Moreover, it can be advantageous to store large volumes of data elsewhere via a storage area network ("SAN").

The casino computer room 620 may include one or more operator consoles or other host devices that are configured for communication with other devices within and outside of the casino computer room 620. Such host devices may be provided with software, hardware and/or firmware for providing various implementations of the disclosure. However, such host devices need not be located within the casino computer room 620. The host devices 660 (which are desktop and laptop computers in this example) and the mobile device 670 (which are PDAs in this example) may be located elsewhere in the gaming establishment 605 or at a remote location.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A network server for providing lock down of a gaming machine by a wireless device associated with a user, comprising:
   a communication component configured to communicate with the wireless device; and
   one or more processors configured to:
      receive a request from the wireless device to lock down the gaming machine;
      determine an access level of the user from a plurality of access levels, wherein the access level indicates that the user has access to lock down the gaming machine according to a designated level of lock down from a plurality of levels of lock down;
      responsive to determining that the user has access, enable the user to lock down the gaming machine according to the designated level of lock down with the wireless device.

2. The network server of claim 1, wherein lock down includes placing the gaming machine in an unplayable state.

3. The network server of claim 1, wherein lock down includes restricting keyless entry to one or more cabinets of the gaming machine.

4. The network server of claim 1, wherein lock down of the gaming machine may further be performed with a physical button on the gaming machine.

5. The network server of claim 1, wherein the communication component is further configured to communicate with the gaming machine and wherein the one or more processors of the network server are further configured to lock down the gaming machine.

6. The network server of claim 1, wherein lock down triggers a visual alarm or an audio alarm.

7. The network server of claim 1, wherein the one or more processors are further configured to:
   receive a request from the wireless device to unlock the gaming machine;
   determine whether the user has access to unlock the gaming machine; and
   responsive to determining that the user has access, enable the user to unlock the gaming machine with the wireless device.

8. The network server of claim 1, wherein the access level of the user indicates that the user has a sufficient level of security clearance to lock down the gaming machine.

9. A gaming machine comprising:
   a communication component configured to communicate with a wireless device; and
   one or more processors configured to:
      receive a request from the wireless device to lock down the gaming machine;
      determine whether an access level of a user associated with the wireless device from a plurality of access levels, wherein the access level indicates that the user has access to lock down the gaming machine according to a designated level of lock down from a plurality of levels of lock down; and
      responsive to determining that the user has access, enable the user to lock down the gaming machine according to the designated level of lock down with the wireless device.

10. The gaming machine of claim 9, wherein lock down includes placing the gaming machine in an unplayable state.

11. The gaming machine of claim 9, wherein lock down includes restricting keyless entry to one or more cabinets of the gaming machine.

12. The gaming machine of claim 9, further comprising a physical lock down button configured to be operable to lock down the gaming machine.

13. The gaming machine of claim 9, wherein the communication component is further configured to communicate with a network server and wherein the one or more processors of the gaming machine are further configured to:
   receive a request for lock down of the gaming machine from the network server; and
   responsive to receiving the request from the network server, lock down the gaming machine.

14. The gaming machine of claim 9, wherein lock down triggers a visual alarm or audio alarm.

15. The gaming machine of claim 9, wherein the one or more processors are further configured to:

receive a request from the wireless device to unlock the gaming machine;

determine whether the user has access to unlock the gaming machine; and responsive to determining that the user has access, enable the user to unlock the gaming machine with the wireless device.

16. The gaming machine of claim 9, wherein the access level of the user indicates that the user has a sufficient level of security clearance to lock down the gaming machine.

17. The gaming machine of claim 9, further comprising a non-volatile memory device and wherein the one or more processors are further configured to:

receive from the wireless device an indication to lock down the gaming machine; and responsive to receiving the indication:

storing the state of the gaming machine in the non-volatile memory, and locking down the gaming machine.

18. A computer-implemented method for providing lock down of a gaming machine by a wireless device associated with a user, comprising:

establishing, by the gaming machine or a network server, a communication session with the wireless device via a wireless network protocol;

receiving, by the gaming machine or the network server, a request from the wireless device to lock down the gaming machine;

determining, by the gaming machine or the network server, an access level of the user from a plurality of access levels, wherein the access level indicates that the user has access to lock down the gaming machine according to a designated level of lock down from a plurality of levels of lock down; and responsive to determining that the user has access, enabling the user to lock down the gaming machine according to the designated level of lock down with the wireless device.

19. The computer-implemented method of claim 18, wherein lock down includes placing the gaming machine in an unplayable state.

20. The computer-implemented method of claim 18, wherein lock down includes restricting keyless entry to one or more cabinets of the gaming machine.

21. The computer-implemented method of claim 18, further comprising locking down the gaming machine responsive to an indication that a physical lock down button on the gaming machine has been pressed.

22. The computer-implemented method of claim 18, further comprising:

sending an indication to lock down the gaming machine from the network server to the gaming machine; and responsive to receiving the indication at the gaming machine, locking down the gaming machine.

23. The computer-implemented method of claim 18, wherein lock down triggers a visual alarm or audio alarm.

24. The computer-implemented method of claim 18, further comprising:

receiving, at the gaming machine or the network server, a request from the wireless device to unlock the gaming machine;

determining, at the gaming machine or the network server, whether the user has access to unlock the gaming machine; and responsive to determining that the user has access, enabling the user to unlock the gaming machine with the wireless device.

25. The computer-implemented method of claim 18, wherein the access level of the user indicates that the user has a sufficient level of security clearance to lock down the gaming machine.

* * * * *